H. ALLEN.
MACHINE TO DETERMINE THE INEQUALITY OF WEIGHT BETWEEN THE THICK AND THIN HALVES OF METAL PIPES.
No. 3,145.                  Patented June 29, 1843.
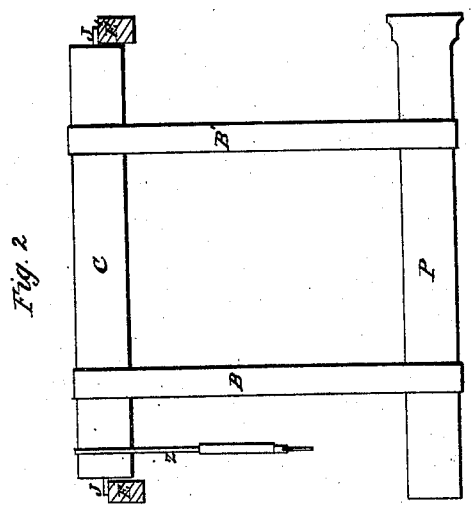
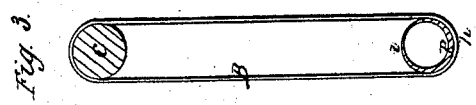
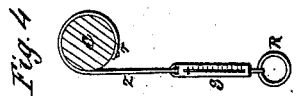
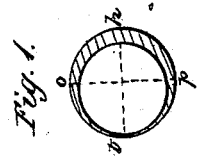
Inventor:
Horatio Allen

UNITED STATES PATENT OFFICE.

HORATIO ALLEN, OF NEW YORK, N. Y.

DETERMINING THE THICKNESS OF METAL PIPES.

Specification of Letters Patent No. 3,145, dated June 29, 1843.

*To all whom it may concern:*

Be it known that I, HORATIO ALLEN, of the city, county, and State of New York, have invented a new and useful Machine called a "Machine to Determine the Inequality of Weight Between the Thick and Thin Halves of Straight Pipes or Tubes," of which the following is a full and exact description.

The object in view is to ascertain whether the pipes or tubes are of uniform thickness, and if not then to ascertain the position of the thinnest part, and to infer the degree of inequality from a knowledge of the difference of weight between the thick and thin halves of the pipe.

Figure 1 is a section of a pipe not of uniform thickness, $t$ and $h$ are respectively the thin and thick parts of the pipe; a line $o\ p$ at right angles to a line joining $t$ and $h$ divides the pipe into two halves, of which the left hand half is the thin half and the right hand half, the thick half. The interior and exterior diameters being known, and the thickness at $t$ and $h$ being known, the difference of weight of the two halves can be calculated; and consequently if the difference of weight be known, the thickness at $h$ and $t$ can be determined. I propose to ascertain the difference of weight in the following manner. Fig. 2 is a front view of the machine. Fig. 3 is a section through one of the bands. Fig. 4 a section through the weighing apparatus.

On the supports E E' is placed the cylinder C in perfect equilibrium, and free to turn with little friction, and if necessary resting on friction rollers. On this cylinder are placed two endless bands B, B' of leather or other materials. Into the loops of these bands is placed the pipe or tube P, and all other support being removed, if there be inequality of thickness, the thick part will bring itself into the lowest position.

The friction between the bands and cylinder and pipe will be sufficient to cause the bands to turn with the cylinder and the pipe with the bands.

To measure or weigh the difference of weight between the thick and thin halves, I place around the cylinder a strap or cord $z$ fastened at $r$, at the end of the strap is attached a spring balance S or platform to receive weights.

By exerting a downward force on the ring R, the pipe P can be made to turn until the heaviest part $h$ is brought into the horizontal plane of the center of the pipe; the tension of the opening in that state of things will be the measure of the difference of weight of the thick and thin halves and the index will give that weight in pounds. The same result could be arrived at by using a platform and weights. An allowance of course must be made for the weight of the strap, spring balance &c.

In the use of this machine it is assumed that the pipes are essentially straight, a slight curvature can be provided for by placing the bands at such distances from the ends of the pipes that the ends may balance the middle. It is also assumed that the thinnest parts are found essentially on the same side of the pipe. In cast iron water pipes, to which this machine is particularly applicable, this is found to be the case, and the indications of the machine have always been verified with as to the position of the thin and thick parts, and as to degree of difference, by cutting the pipe after trial.

The power to turn the cylinder can be applied through any of the well known means of turning a cylinder, but that herein described is considered most convenient.

What I claim is—

The combination of the cylinder, bands and weighing apparatus herein described or referred to, for the objects and substantially in the manner herein described.

In testimony whereof I the said Horatio Allen hereto subscribe my name in the presence of the witnesses whose names are hereunto subscribed on the twelfth day of June 1843.

HORATIO ALLEN.

Signed in the presence of—
 Jos. C. VANDERVONS,
 A. V. HAMMOND.